Sept. 26, 1939.　　　J. H. CANTRELL　　　2,174,119
BELT DRIVE
Filed Jan. 11, 1938　　　2 Sheets-Sheet 1
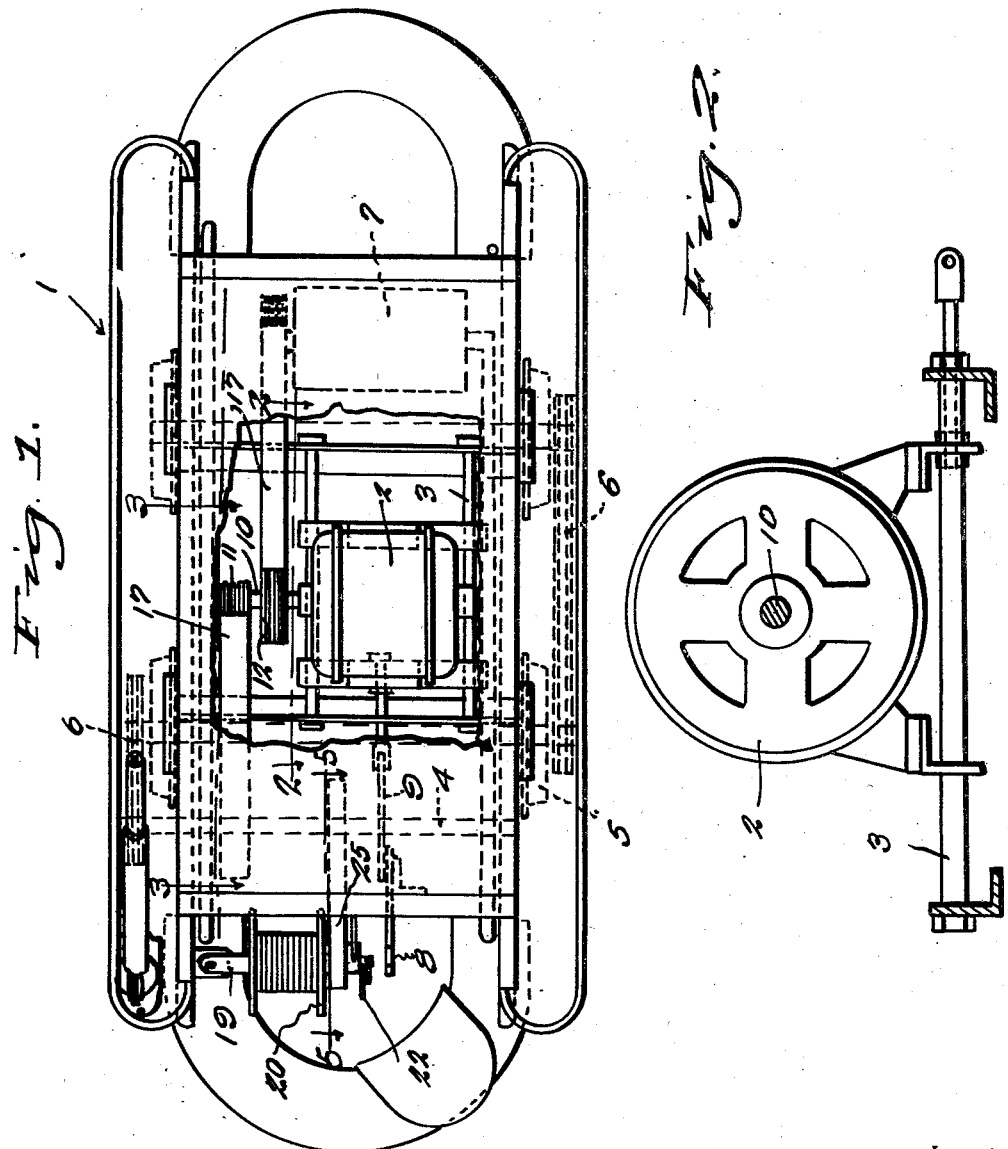
Inventor
James H. Cantrell
By Clarence A. O'Brien
Hyman Berman
Attorneys

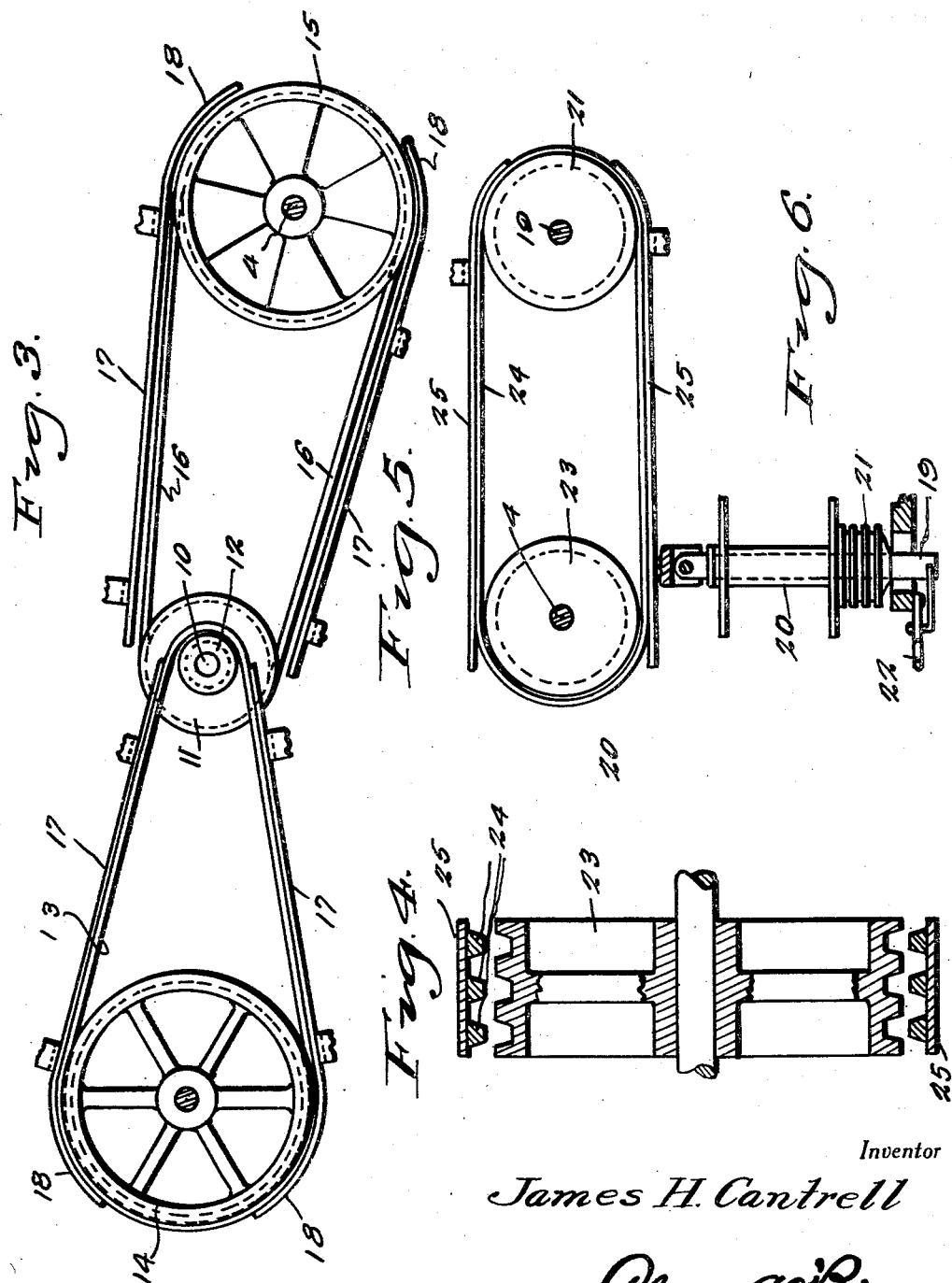

Patented Sept. 26, 1939

2,174,119

UNITED STATES PATENT OFFICE 2,174,119

BELT DRIVE

James H. Cantrell, Jellico, Tenn.

Application January 11, 1938, Serial No. 184,480

1 Claim. (Cl. 74—223)

The present invention relates to new and useful improvements in belt drives and has for one of its important objects to provide, in a manner as hereinafter set forth, novel means whereby the belt or belts may be rendered inoperative when desired.

Another very important object of the invention is to provide a construction and arrangement whereby a plurality of drives may be operated independently from the same source of power.

Other objects of the invention are to provide a belt drive of the character described which will be comparatively simple in construction, strong, durable, highly efficient and reliable in use, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a mobile air compressor equipped with the present invention.

Figure 2 is a view in vertical longitudinal section, taken substantially on the line 2—2 of Fig. 1.

Figure 3 is a view in vertical longitudinal section, taken substantially on the line 3—3 of Fig. 1.

Figure 4 is a view in vertical section through one of the drive pulleys, the guides and the belts, said belts being shown disengaged from or standing away from the pulley.

Figure 5 is a view in side elevation of a single drive, substantially on the line 5—5 of Figure 1.

Figure 6 is a view principally in top plan showing a mounting which may be used for the driven pulley in a single drive.

Referring now to the drawings in detail, it will be seen that the reference numeral 1 designates generally a wheel supported air compressor having mounted transversely therein an electric motor 2. The motor 2 is mounted for longitudinal sliding movement on rods 3 which are provided therefor in the frame of the compressor 1. Journalled transversely in the compressor 1 is a counter shaft 4 which drives the wheels 5 of the machine through suitable chain and sprocket connections 6. The machine 1 further includes a pump or compressor 7. A hand lever 8 is connected to the motor 2 by means including a link 9 for shifting said motor on the rods 3.

Fixed on the shaft 10 of the electric motor 2 are grooved pulleys 11 and 12. Trained over the pulley 12, and over a pulley on the shaft of the compressor 7, is a plurality of substantially V-shaped belts 13. The pulley on the compressor 7 is designated by the reference numeral 14. Trained over the pulley 11, and over a pulley 15 on the counter shaft 4, is a plurality of substantially V-shaped belts 16. Guides 17 are mounted adjacent the upper and lower flights of the belts 13 and 16 in the manner shown to advantage in Fig. 3 of the drawings. One end portion of the guides 17 follows the peripheries of the driven pulleys 14 and 15, as at 18. The other ends of the guides 17, which are adjacent the driving pulleys 11 and 12, are straight and spaced a greater distance from the belts 13 and 16 than the ends 18.

Mounted for swinging movement on one end portion of the machine 1 is a shaft 19 having journalled thereon a reel 20. Fixed on one end of the reel 20 is a grooved pulley 21. A lever 22 is connected to the free end of the shaft 19 for swinging same. Trained over the pulley 21 and a pulley 23 on the counter shaft 4 is a plurality of substantially V-shaped belts 24. Mounted above and below the upper and lower flights of the belts 24 and adjacent thereto are guides 25 which are substantially similar to the guides 17.

Briefly, the operation of the invention is substantially as follows:

When it is desired to drive the shaft 4, for example, the electric motor 2 is shifted from left to right as viewed, in Fig. 1 of the drawings, thereby tightening the belts 16 and at the same time loosening the belts 13 to the compressor 7. The belts and pulleys are of conventional construction and it may be well to here state that when a V-belt is loosened it has a tendency to assume a circular shape. Now, when the belts 13 or 16 are loosened they are prevented by the guides 17 from assuming a substantially circular shape and are caused to stand away from or in other words be disengaged from the pulleys. The curved end portions of the guides 17, which are comparatively close to the belts, cause said belts to loosen from the driving pulleys to a greater extent than from the driven pulleys. The manner in which the belts are disengaged from the pulleys is shown to advantage in Fig. 4 of the drawings.

When it is desired to drive the reel 20 from the countershaft 4, the shaft 19, through the medium of the lever 22 or other suitable means, is swung in a direction to tighten the belts 24. When it is desired to disconnect the reel 20 from the countershaft 4, the shaft 19 is swung in the opposite direction for loosening the belts 24 and the guides 25 cause said belts to stand away from or loosen on the pulleys 21 and 23. The guides 25 may be connected in any suitable manner to the shaft 19 to shift with the reel pulley 21.

It is believed that the many advantages of a belt drive constructed in accordance with the present invention will be readily understood and although preferred embodiments of the device are as illustrated and described, it is to be understood that further changes in the details of construction and in the combination and arrangement of parts may be resorted to which will fall within the scope of the invention as claimed.

What is claimed is:

A drive mechanism of the class described comprising, in combination, a supporting structure, a pair of spaced driven members mounted on said supporting structure, a pair of parallel rods mounted on the supporting structure between the driven members and at right angles thereto, a power plant slidably mounted on the rods, belt and pulley connections for operatively connecting said power plant to the driven members, and means for shifting the power plant in opposite directions for tightening either of the belts of said connections for selectively connecting the driven members to said power plant for actuation thereby.

JAMES H. CANTRELL.